United States Patent [19]

Stone

[11] Patent Number: 5,050,780
[45] Date of Patent: Sep. 24, 1991

[54] SELF SEALING TOP ASSEMBLY FOR OPEN MOUTH COFFEE POTS

[75] Inventor: Wayne B. Stone, Bethesda, Md.

[73] Assignee: Wood Manufacturing Co., Inc., Flippin, Ark.

[21] Appl. No.: 921,881

[22] Filed: Oct. 22, 1986

Related U.S. Application Data

[63] Continuation of Ser. No. 532,980, Sep. 16, 1983, abandoned.

[51] Int. Cl.$^5$ .............................................. B67D 1/08
[52] U.S. Cl. ..................................... 222/188; 222/456; 222/464
[58] Field of Search ........ 222/188, 464, 481, 156–157, 222/456, 454, 566; 220/228, 205, 361; 99/275; 215/234, 259

[56] References Cited

U.S. PATENT DOCUMENTS

| | | | |
|---|---|---|---|
| 251,151 | 12/1881 | Winfield et al. | 222/188 |
| 642,787 | 2/1900 | Eakin | 222/188 |
| 831,419 | 9/1906 | Day | 222/188 |
| 1,534,670 | 4/1925 | Smith | 222/188 |
| 1,601,723 | 10/1926 | Elbert | 222/456 |
| 2,190,092 | 2/1940 | Bailey | 222/456 |
| 2,425,142 | 8/1947 | Brubaker | 222/456 |
| 3,171,571 | 3/1965 | Daniels | 222/464 |
| 4,171,075 | 10/1979 | Gangwisch | 222/456 |
| 4,361,257 | 11/1982 | Stone, Jr. | 222/464 |
| 4,390,108 | 6/1983 | Knoll | 220/228 |

FOREIGN PATENT DOCUMENTS 478147  2/1953  Italy ..................................... 222/456

Primary Examiner—Robert P. Olszewski
Assistant Examiner—Kenneth Noland
Attorney, Agent, or Firm—Banner, Birch, McKie & Beckett

[57] ABSTRACT

The invention is directed to a top assembly for an imperforate walled, open mouth coffee pot. The top assembly includes a liquid trap through which coffee is introduced from the exterior of the pot to the interior thereof and through which coffee is subsequently decanted from the pot.

2 Claims, 3 Drawing Sheets 5,050,780

1

SELF SEALING TOP ASSEMBLY FOR OPEN MOUTH COFFEE POTS

CROSS-REFERENCE TO RELATED PATENTS AND APPLICATIONS

The following patents and applications disclose methods and apparatus for reducing the oxidation and evaporation of coffee to extend the "pot life" of the same. U.S. Pat. Nos. 3,974,758; 4,361,257; application Ser. No. 233,505 filed Feb. 11, 1981; application Ser. No. 369,152 filed Apr. 16, 1982, and application Ser. No. 476,444 filed Mar. 17, 1983, (continuation of application Ser. No. 216,834 filed Dec. 15, 1980, now abandoned.)

This application is a continuation of application Ser. No. 532,980, filed Sept. 16, 1983, now abandoned.

BACKGROUND OF THE INVENTION

The foregoing patents and patent applications are all directed to methods and apparatus for ameliorating the deterioration of coffee by substantially reducing both the oxidation and evaporation of the same. The entire disclosures of the aforesaid patents and applications are herein incorporated by reference.

If freshly brewed coffee be totally sealed with respect to atmosphere it will remain fresh indefinitely. This, of course, is not practical from the standpoint of conventional usage. Accordingly, the desire is to approach the state of total sealing of the coffee while yet being able to dispense the same in conventional fashion that requires no manipulative steps in addition to those required to pour from any conventional coffee pot. This has been achieved, in the past, by substantially sealing the open mouth of the coffee pot and dispensing coffee therefrom through a pour spout which opens into the pot immediately adjacent the bottom thereof so that one, in effect, pours from the bottom of the pot. The coffee within the pour spout acts as a liquid seal to protect the remainder of the coffee in the pot from atmospheric exposure through the pour spout. In order to dispense coffee from a substantially sealed pot there must be some means of maintaining atmospheric pressure on the coffee so that a vacuum lock does not prevent pouring. In the past this has been achieved either by the use of a flexible follower or restricted vent means of such restricted area that the greater vapor pressure of the hot coffee contained within the pot exceeds atmospheric pressure so that air does not enter the restricted vent means except during that time when coffee is actually being dispensed. Thus, in the case of a ten-cup coffee maker, for example, only ten cups of air are indrawn to the pot over that period of time until the entire pot is emptied which ten cup volume of air is negligible as compared with the normal large influx of air that takes place in a conventional, unsealed coffee pot.

Prior substantially sealed coffee pots which employ an outside pour spout opening into the bottom of the pot have been successful in function but expensive to manufacture. About the only practical method of making such a coffee pot with an outside pour spout is by slip casting porcelain material. This is expensive and production rates are low. The usual method of coffee pot manufacture in the United States involves blown borosilicate glass. This is by far the most economical method of manufacture and literally thousands of pieces per hour can be manufactured with relatively inexpensive tooling. Blown borosilicate glass, however, can only be produced in a shape that is rotationally symmetrical because of the manner in which the glass must be removed from the molds. For this reason, a coffee pot with an outside pour spout cannot be made from blown borosilicate glass.

Other efforts to take advantage of the use of a liquid seal in a pour spout extending to the bottom of a pot while constructing the pot from blown borosilicate glass have involved the use of a long pour spout extending down from a top assembly inside the glass pot. This works well in the case of a glass pot having cylindrical side walls whereby the downwardly extending pour spout can rest adjacent one side wall so that all of the coffee can be dispensed from the pot. Unfortunately, the usual design for glass coffee pots is to have an enlarged lower end so that a great deal of the coffee can not be dispensed through an inside pour spout as the coffee level lowers. Accordingly, to make use of an inside pour spout requires special tooling and the use of a special, cylindrically shaped pot to achieve the desired objective of reducing oxidation and evaporation.

SUMMARY OF THE INVENTION

It is the purpose of the present invention to provide a self sealing top assembly which may be used with any imperforate walled open mouth coffee pot and through which freshly brewed coffee may be introduced into the pot and through which coffee may be dispensed from the pot. In both the introduction and dispensing of coffee a seal is automatically effected as a function of the introduction or dispensing of coffee and the seal remains intact from the initial introduction of approximately the first ounce of coffee into the pot until the last of the coffee has been dispensed from the pot.

The top assembly is formed with a liquid trap and a restricted vent means. The restricted vent means is on the order of a $\frac{1}{8}''$ diameter hole.

As the first of a quantity of freshly brewed coffee flows through flow passage means in the top assembly, which flow passage means includes a liquid trap, the interior of the pot is immediately sealed with respect to incoming air. The liquid seal blocks any air inflow through the flow passage means and the vapor pressure of the hot coffee inside the pot, which exceeds atmospheric pressure, blocks any atmospheric inflow through the restricted vent means. This condition obtains until such time as a cup of coffee is to be dispensed. As a cup of coffee is dispensed the liquid seal is maintained intact and a one-cup volume of air is indrawn through the restricted vent means as the cup of coffee is dispensed.

Repeated testing shows no noticeable deterioration of the coffee and aroma over a full 4 hour period. Coffee maintained in excess of 20 hours with the top assembly herein described in place shows no evaporation and is free from that "bitter" taste normally associated with coffee that is 2 or 3 hours old.

The big advantage of the top assembly herein disclosed is that it can be manufactured at a very low cost and made to fit any open mouth coffee pot, and particularly conventionally blown borosilicate pots.

DESCRIPTION OF THE DRAWINGS

The drawings are full scale.

DESCRIPTION OF THE PREFERRED EMBODIMENTS

Figure 1:
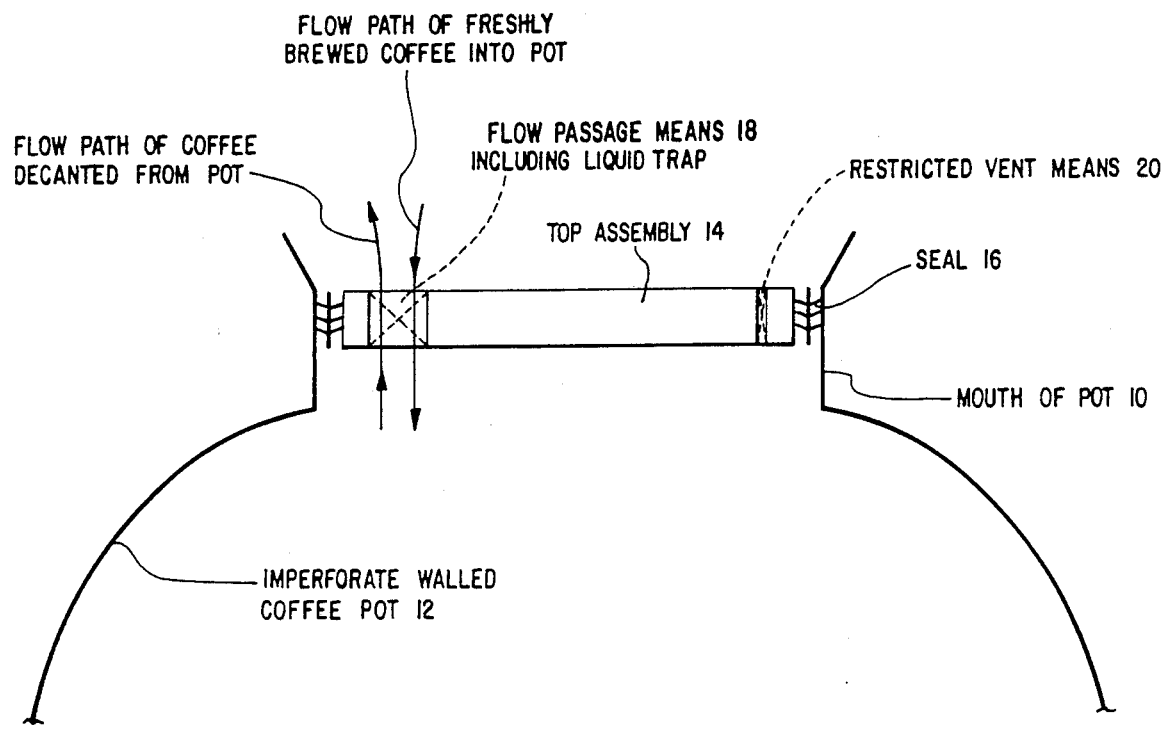
FIG. 1 is a diagrammatic illustration of the concept incorporated in the various specific embodiments.
Figure 2:
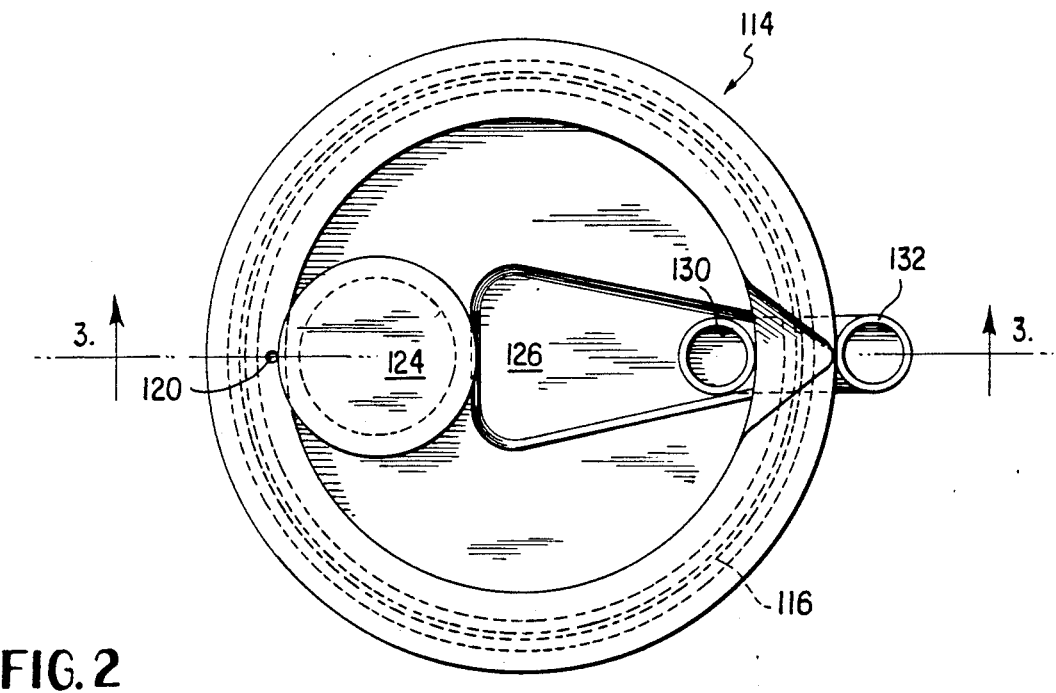
FIG. 2 is a top plan view of a self sealing top assembly.

FIG. 1 is a diagrammatic illustration of the concept herein disclosed as incorporated in the various embodiments shown in FIGS. 2-8.

The open mouth 10 of an imperforate walled coffee pot 12 is sealed by a top assembly 14 whose peripheral seal 16 is sealingly engaged with the open mouth 10. Extending through the top assembly is flow passage means 18, which includes a liquid trap. A critical factor of the invention is that the flow of freshly brewed coffee into the pot and the flow of coffee from the pot is through the same portion of the flow passage means which includes the liquid trap. This insures that the interior of the pot is sealed with respect to atmosphere, through the flow passage means, immediately upon initial flow of freshly brewed coffee into the pot. Top assembly 14 includes restricted vent means 20 which is sufficiently large to preclude the formation of a vaccum lock and thus permit pouring of the coffee but of such small size as to insure that a vapor seal remains intact across the vent means when hot coffee is in the pot. The vent means typically comprise a vent hole having a diameter of $\frac{1}{8}"\pm 1/16"$.

Thus as freshly brewed coffee initially enters flow passage means 18 a liquid seal is established in the liquid trap. The residual air in the pot is thereafter displaced, through the vent means, as the pot is filled with freshly brewed coffee. Inasmuch as the coffee pot is supported on a warming burner and the liquid contents thereof maintained at approximately 180° F. it will be apparent that the vapor pressure of the heated coffee within the pot exceeds atmospheric pressure. Therefore, a vapor seal is established across the vent means precluding the entry of air therethrough at all times except when coffee is actually being dispensed. The amount of air thus indrawn during decanting (say ten cups over a four hour period, for example) produces negligible oxidation of the coffee as compared with the continual large influx of air characteristic of conventional, unsealed coffee pots. Evaporation is substantially zero.

This basic concept characterizes the specific embodiments illustrated herein. The various embodiments differ, primarily, in the manner in which the liquid trap is formed within the flow passage means. The preferred mode, primarily from a manufacturing standpoint, is to form the flow passage means as a tube formed generally in the shape of the letter "J" whereby a liquid trap is defined in the loop of the J.

Figure 3:
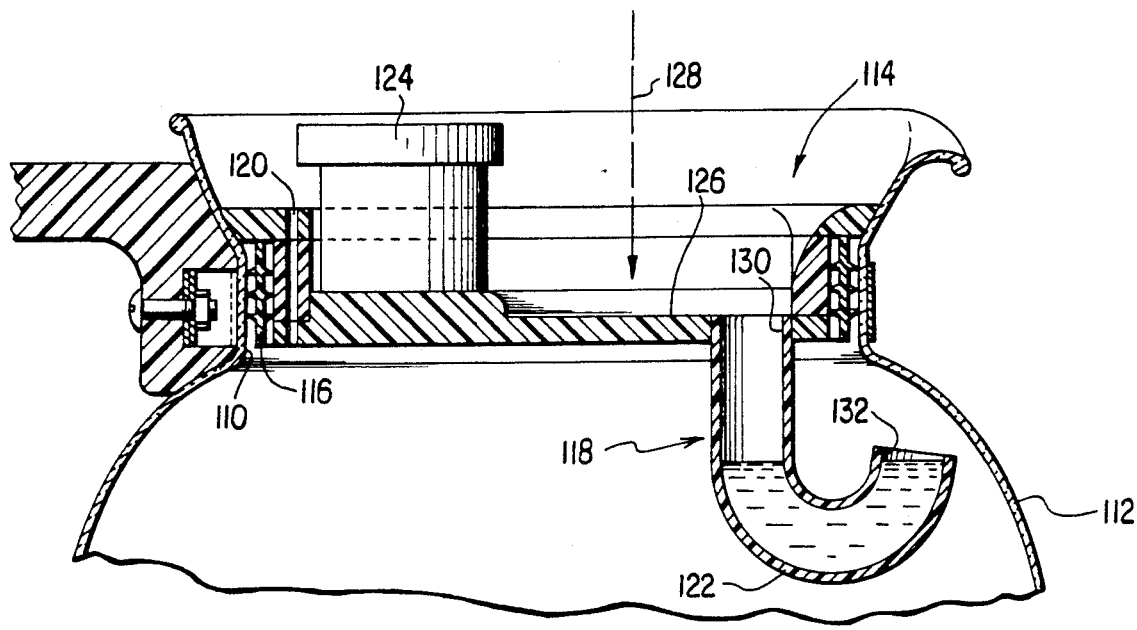
FIG. 3 is a sectional view along line 3—3 of FIG. 2, with a part in elevation, and illustrating the top assembly in sealing engagement with the open mouth of a coffee pot.
Figure 4:
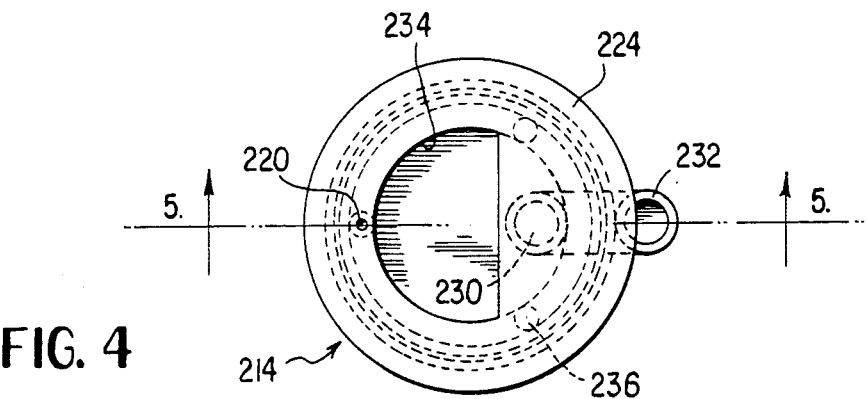
FIG. 4 is a top plan view of a modified self sealing top assembly.

In FIG. 3 is illustrated a conventional, blown borosilicate coffee pot 112 having a relatively large open mouth 110 which is typical of household coffee pots designed to receive freshly brewed coffee from an automatic drip coffee maker. Top assembly 114 is sealingly engaged with open mouth 110 as by a removable seal 116. Flow passage means 118 comprising a hook, or J, shaped tube and vent means 120 are the only openings through the top assembly. The lower bent portion 122 of flow passage means 118 defines a liquid trap. The upper surface of the top assembly includes a handle 124 and a recessed trough 126 to direct coffee flow 128 from an overlying drip coffee maker to the upper end 130 of flow passage means 118. As the freshly brewed coffee traverses flow passage means 118 a liquid seal is established in liquid trap 122, as illustrated in FIG. 3, and freshly brewed coffee exits the lower end 132 of the flow passage means to enter pot 112.

Figure 5:
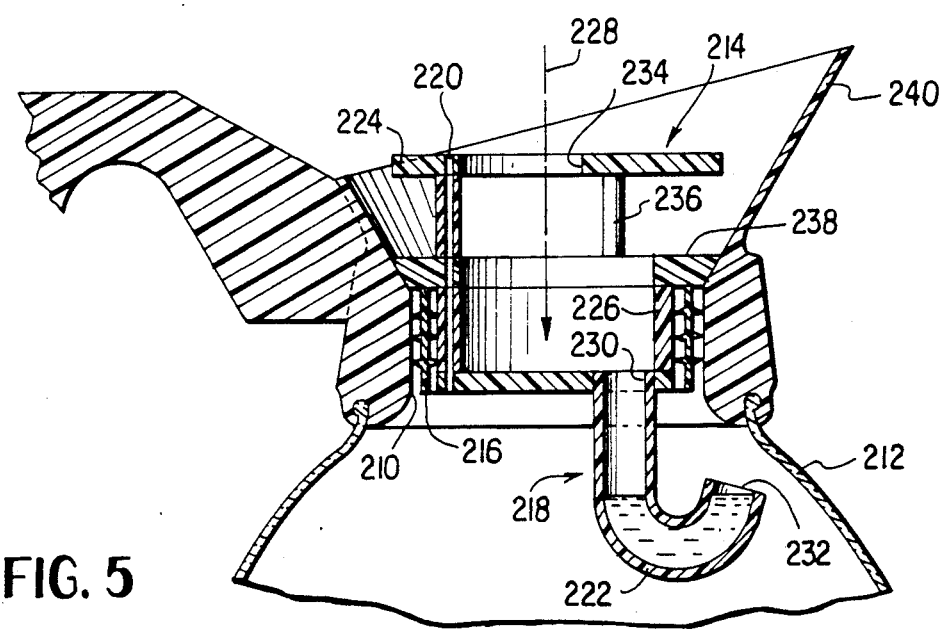
FIG. 5 is a sectional view along line 5—5 of FIG. 4 and illustrating the top assembly in sealing engagement with the open mouth of a coffee pot.

The imperforate walled coffee pot 212, shown in FIG. 5, is a typical commercial type pot designed to receive freshly brewed coffee from a commercial drip coffee maker. A top assembly 214 is sealingly engaged with open mouth 20 as by a removable seal 216. Flow passage means 218 comprises a hook, or J, shaped tube. The lower bent portion 222 of flow passage means 218 defines a liquid trap. The upper surface of the top assembly includes a handle 224 and a hollow interior 226 within which the coffee flow 228 from an overlying drip coffee maker is confined prior to gravity flowing into the upper end 230 of flow passage means 218. As the freshly brewed coffee traverses the flow passage means a liquid seal is established in liquid trap 222 as freshly brewed coffee exits the lower end 232 of the flow passage means to enter pot 212. Handle 224 comprises a ring-like member having a central opening 234 through which freshly brewed coffee may flow into the hollow interior 226. The ring-like handle is integral, via support posts 236, with the pot engaging rim 238 of the top assembly. Vent means 220 extends from the upper surface of handle 224 and through a support post 236, remote from flow passage means 218, to vent the interior of pot 212. As coffee is dispensed from the pot shown in FIG. 5, the flow path is through flow passage means 218, across the front wall of the hollow interior 226, between the posts 236 and across the pour lip 240 of coffee pot 212.

Figure 6:
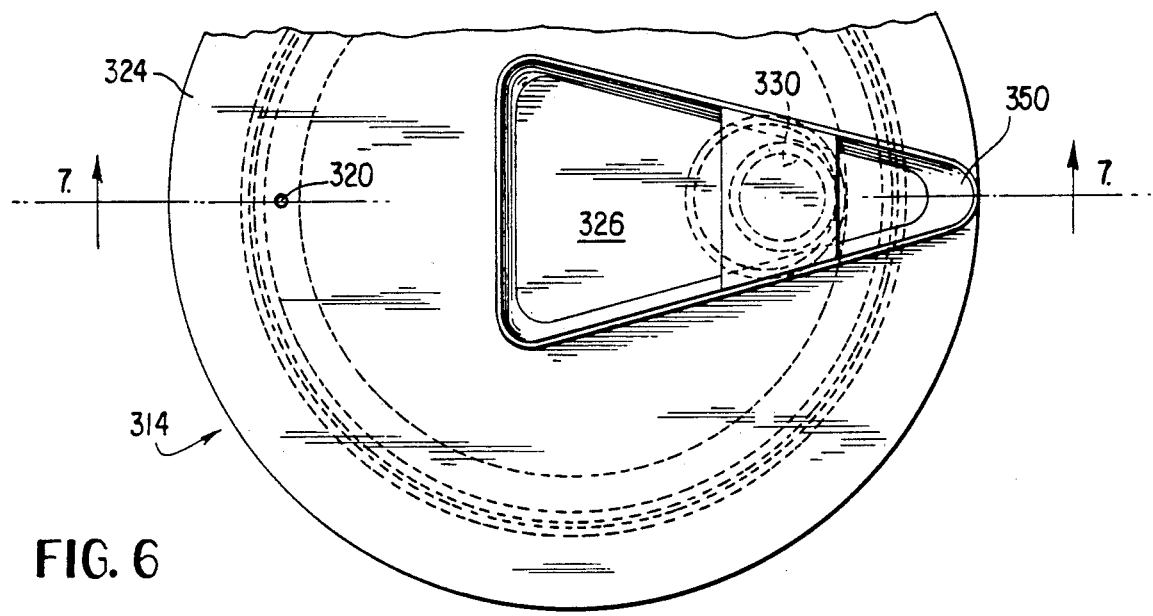
FIG. 6 is a broken top plan view of a further embodiment of a self sealing top assembly.
Figure 7:
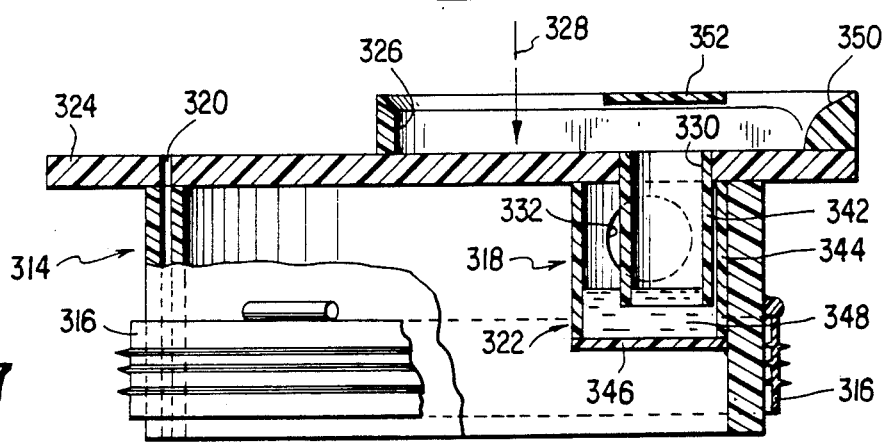
FIG. 7 is a sectional view along line 7—7 of FIG. 6, with parts in elevation.

The self sealing top assembly 314, shown in FIGS. 6 and 7, is adapted to sealingly engage the open mouth of a coffee pot of the type shown in FIG. 3 as by removable seal 316. Flow passage means 318 and vent means 320 comprise the only openings through the top assembly. The peripheral outer flange 324 comprises the handle for gripping the top inasmuch as the same rests on and extends beyond the upper peripheral lip of the coffee pot with which it is used such as, for example, the pot shown in FIG. 3. The upper surface of the top assembly includes an upstanding trough 326 to direct the coffee flow 328 from an overlying drip coffee maker to the upper end 330 of the flow passage means. As the freshly brewed coffee traverses flow passage means 318 a liquid seal is established in a liquid trap 322, as illustrated in FIG. 7, and freshly brewed coffee exits the lower flow passage opening 332 to enter the associated coffee pot. Unlike the flow passage means and liquid trap in FIGS. 2-5 wherein the wall means defining the overall flow passage means are continuous and form the liquid trap as a function of the shape of the continuous wall means, the wall means defining the flow passage means 318 are discontinuous as best seen in FIG. 7. Thus the upper end 330 of the flow passage means 318 is the upper end of a tube 342 which extends below the level of opening 332 in the side wall of a cup-shaped member 344 whose closed lower end 346 is spaced below the lower end of tube 342. The level of the trapped coffee 348 illustrates the trap. When coffee is to be dispensed, it flows from the coffee pot through opening 332, the trap 322, out tube 342 across the forward end of trough 326 and across pour lip 350 formed on the extreme forward end of trough 326 The baffle 352 is to avoid any splash of coffee from the trap as the sealed top is removed from the pot when the pot is empty.

Figure 8:
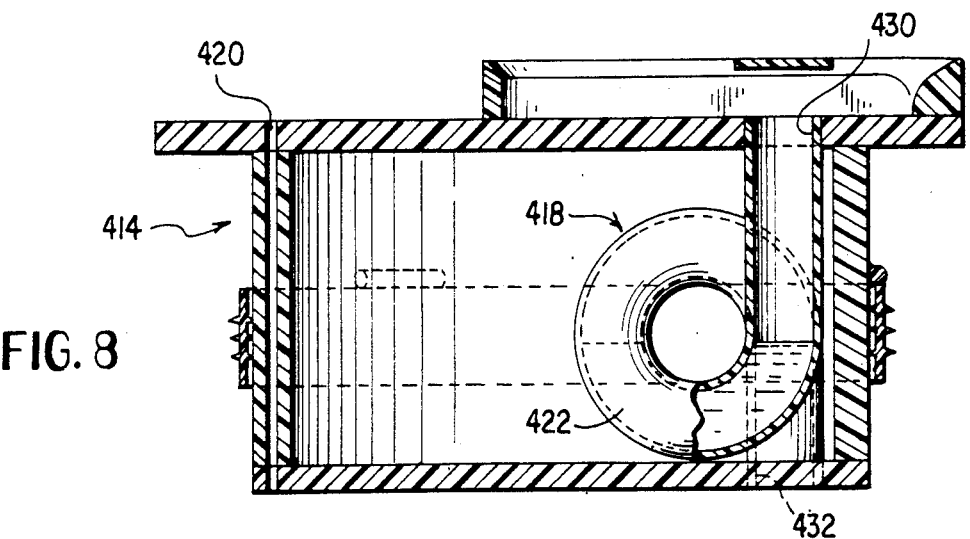
FIG. 8 is a vertical sectional view, with parts in elevation, of a further modification.

The self sealing top assembly 414, shown in FIG. 8, is identical to that of FIGS. 6 and 7 except for the formation of flow passage means wherein, again, the same is formed with continuous wall means in the form of a tube bent through 360°. The upper end 430 exits the top wall of the top assembly and the lower end 432 exits an integral bottom plate. Again the only openings through the top assembly are the flow passage means 418, containing the liquid trap portion 422, and the vent means 420.

In each of the embodiments thus far described the flow path of freshly brewed coffee flowing into the pot and the flow path of coffee subsequently decanted from the pot is identical except for the flow direction, i.e., either into or out of the pot. Stated differently, in the embodiments of FIGS. 2-8, the entire length of the "flow passage means" is traversed by the coffee both when it is inflowing to the pot and outflowing from the pot.

As pointed out, previously, the important fact is that both the inflow to the pot and outflow from the pot be through that portion of the flow passage means which includes the liquid trap. Thus from the standpoint of the invention it is not necessary that both the inflow and outflow traverse the precise same flow path so long as both the inflow and outflow traverse the liquid trap which constitutes a part of the flow passage means. For example, with reference to FIG. 3, if the longer leg of the J shaped flow passage means was $\frac{3}{4}$" longer to extend $\frac{3}{4}$" above the bottom of trough 126 and a $\frac{1}{4}$" hole were bored in the backside of the upwardly extending leg at the level of the bottom of trough 126; then inflow to the pot would be through the bored hole, through the liquid trap 122 and into the pot while outflow therefrom would be through the liquid trap and out the upwardly extended ($\frac{3}{4}$" above the level of trough 126) end of the J shaped flow passage means.

The expression "restricted vent means" as used herein means vent means of such restricted cumulative (if more than one vent is provided) area as to insure that coffee maintained at 180° F. within the coffee pot, with the liquid seal intact, will establish an equilibrium vapor pressure within the pot which exceeds atmospheric pressure.

I claim:

1. A method of brewing, maintaining, and pouring coffee to reduce oxidation and evaporation of coffee as brewed by an automatic coffee maker comprising:
   brewing coffee in an automatic coffee maker;
   providing a coffee pot having an opening which establishes a single passageway into which brewed coffee is received from the automatic coffee maker and from which brewed coffee is dispensed from the pot;
   establishing a flow of brewed coffee through the single passageway into the coffee pot;
   trapping a portion of the brewed coffee within the single passageway to create a liquid seal; and
   pouring brewed coffee through the single passageway while continuously trapping a portion of the brewed coffee in the single passageway to thereby maintain the liquid seal until substantially all of the coffee has been dispensed from the coffee pot.

2. A coffee pot assembly comprising:
   an open mouth coffee pot, and a top assembly for substantially sealing the open mouth of said coffee pot, and a restricted vent in said top assembly;
   a seal for sealing said top assembly with respect to the open mouth of said coffee pot;
   a liquid flow passage through which freshly brewed coffee is introduced from the exterior of said coffee pot assembly to the interior thereof and subsequently dispensed from the interior of said coffee pot assembly externally thereof, said liquid flow passage including a liquid trap for retaining a volume of coffee therein following the introduction of coffee therethrough into said coffee pot assembly and for retaining a volume of coffee therein following the dispensing of coffee therethrough from the interior of said coffee pot assembly whereby a liquid seal, comprising a volume of coffee, occludes the remainder of pot contained coffee from the atmosphere; and
   a guide on said top assembly for directing coffee flow from an overlying drip coffee maker to said flow passage.

* * * * *